Figure 1:
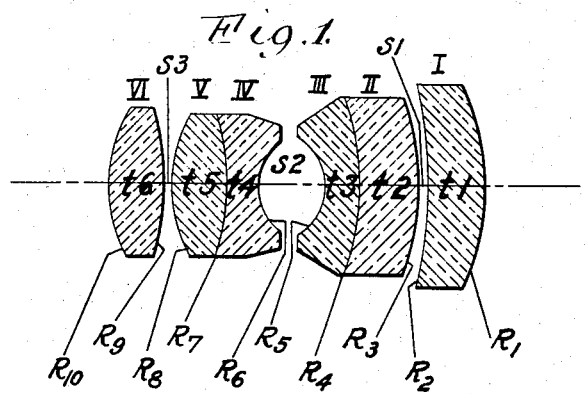

Nov. 28, 1944.  N. GOTTLIEB  2,363,788
LENS SYSTEM
Filed Aug. 27, 1942

INVENTOR.
NATHAN GOTTLIEB

Patented Nov. 28, 1944

2,363,788

UNITED STATES PATENT OFFICE 2,363,788

LENS SYSTEM

Nathan Gottlieb, Buffalo, N. Y., assignor to Spencer Lens Company, Buffalo, N. Y., a corporation of New York Application August 27, 1942, Serial No. 456,439

1 Claim. (Cl. 88—57)

This invention relates to lenses and more particularly to high aperture projection or photographic objectives.

It is an object of the invention to provide a high aperture objective of the planar type which is corrected for lateral color, curvature of field, distortion, coma and spherical aberration and oblique spherical aberration.

It is another object of the invention to provide an f/2.0 lens which is of relatively simple and economical construction.

Other objects and advantages of the invention will be apparent from the following description taken in connection with the accompanying drawing and it will be seen that many changes may be made in the details of construction and arrangement of parts without departing from the spirit of the invention as expressed in the accompanying claim. I therefore do not wish to be limited to the exact details of construction and arrangement of parts shown and described as the preferred form has been shown by way of illustration only.

Referring to the drawing, the single figure is a sectional view showing a lense system embodying the invention.

The specifications corresponding to the accompanying drawing are as follows:

F=100 mm.     f/2.0

| Lens | Glass | | Radii | Spacings |
|---|---|---|---|---|
| | $N_D$ | $\nu$ | | |
| I | 1.6109 | 57.2 | $R_1 = +34.81$ mm.<br>$R_2 = +184.26$ mm. | $t_1 = 4.13$ mm.<br>$S_1 = 1.22$ mm. |
| II | 1.6109 | 57.2 | $R_3 = +18.85$ mm.<br>$R_4 = +54.33$ mm. | $t_2 = 4.82$ mm. |
| III | 1.6185 | 36.6 | $R_5 = +13.02$ mm. | $t_3 = 2.07$ mm.<br>$S_2 = 8.66$ mm. |
| IV | 1.6109 | 57.2 | $R_6 = -14.34$ mm.<br>$R_7 = +138.36$ mm. | $t_4 = 2.07$ mm. |
| V | 1.6109 | 57.2 | $R_8 = -18.80$ mm. | $t_5 = 4.82$ mm.<br>$S_3 = .73$ mm. |
| VI | 1.6109 | 57.2 | $R_9 = +281.75$ mm.<br>$R_{10} = -33.39$ mm. | $t_6 = 4.13$ mm. |

In the figure, the successive radii of curvature, counting from the front are designated $R_1$, $R_2$, etc., the sign $+$ denoting that the curve is convex toward the incident light, and $-$ that it is concave toward the same. The axial thickness of the elements are denoted by $t_1$, $t_2$, $t_3$, etc., and the separations of the components by $S_1$, $S_2$ and $S_3$. The material is defined in terms of the mean refractive index $N_D$, and the Abbé $\nu$ number is also given.

It will be noted that the elements I, II, IV, V and VI are of a dense barium crown glass while the element III is of a medium flint glass.

It is pointed out that the present system may be employed as a photographic or projection objective or may be used in telescopes or other uses where a high aperture is required.

It is further pointed out that the present system is of the planar type and has been corrected for lateral color, curvature of field, distortion, spherical aberration and oblique spherical aberration and coma and gives a relatively flat field.

It is further pointed out that as the construction of the system is relatively simple that it therefore provides an economical high speed arrangement.

From the foregoing it will be seen that I have provided simple, efficient and economical construction for an f/2.0 planar type objective having a high speed and high aperture.

Having described my invention, I claim:

A lens system of the character described comprising four axial components, the second and third of which are cemented doublets, and having substantially the numerical data set forth in the following table wherein $R_1$ $R_2$ . . . designate the radii of the successive lens surfaces counting from the front $t_1$ $t_2$ . . . the axial thickness of the individual elements and $S_1$, $S_2$ and $S_3$ the axial air separations, $N_D$ the mean refractive index and $\nu$ the Abbé $\nu$ number, F=100 mm.     f/2.0

| Lens | Glass | | Radii | Spacings |
|---|---|---|---|---|
| | $N_D$ | $\nu$ | | |
| I | 1.6109 | 57.2 | $R_1 = +34.81$ mm.<br>$R_2 = +184.26$ mm. | $t_1 = 4.13$ mm.<br>$S_1 = 1.22$ mm. |
| II | 1.6109 | 57.2 | $R_3 = +18.85$ mm.<br>$R_4 = +54.33$ mm. | $t_2 = 4.82$ mm. |
| III | 1.6185 | 36.6 | $R_5 = +13.02$ mm. | $t_3 = 2.07$ mm.<br>$S_2 = 8.66$ mm. |
| IV | 1.6109 | 57.2 | $R_6 = -14.34$ mm.<br>$R_7 = +138.36$ mm. | $t_4 = 2.07$ mm. |
| V | 1.6109 | 57.2 | $R_8 = -18.80$ mm. | $t_5 = 4.82$ mm.<br>$S_3 = .73$ mm. |
| VI | 1.6109 | 57.2 | $R_9 = +281.75$ mm.<br>$R_{10} = -33.39$ mm. | $t_6 = 4.13$ mm. |

NATHAN GOTTLIEB.